P. SCHOU.
MEANS FOR REMOVING MOISTURE FROM AIR AND GASES.
APPLICATION FILED JUNE 20, 1913.
1,086,089.
Patented Feb. 3, 1914.
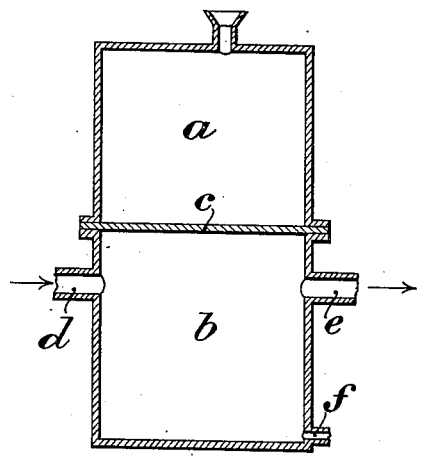
WITNESSES:
John Murtagh
F. Hogg.
INVENTOR:
Paul Schou
BY Goepel & Goepel
ATTORNEYS.

UNITED STATES PATENT OFFICE.

PAUL SCHOU, OF COPENHAGEN, DENMARK.

MEANS FOR REMOVING MOISTURE FROM AIR AND GASES.

1,086,089. Specification of Letters Patent. Patented Feb. 3, 1914.

Application filed June 20, 1913. Serial No. 774,940.

*To all whom it may concern:*

Be it known that I, PAUL SCHOU, a citizen of the Kingdom of Denmark and residing at No. 11 Puggaardsgade, Copenhagen, Denmark, have invented new and useful Improvements in Means for Removing Moisture from Air and Gases, of which the following is a specification.

This invention relates to means for removing moisture from air and gases, hereinafter called "moisture absorbers."

In moisture absorbers in which the absorption of water vapors is effected by means of sulfuric acid it is evidently of great importance to keep the space within which each molecule of sulfuric acid can come in contact with the water vapors as small as possible, and is also of importance to use as little sulfuric acid as possible during the absorption period. By the methods now used large absorption surfaces are obtained for example by letting the sulfuric acid trickle along a large number of glass tubes, these tubes being either dipped in sulfuric acid or the acid being pumped over their surfaces. By all these methods however, certain mechanical devices are required, which, in spite of their simplicity nevertheless require power and are expensive.

The present invention relates to an absorber differing from those already on the market in that the sulfuric acid is only used once, and that during each absorption period only as much sulfuric acid is introduced into the absorber as is necessary to absorb the water vapors, it being assumed, that during a certain unit of time the amount of water vapors passing through the absorber is constant. In a moisture absorber according to this invention a porous plate or partition is arranged between two chambers or vessels, the absorption medium passing from the one chamber or vessel to the other through the said plate or partition. The porous plate or partition is of such a nature as only to allow the necessary amount of the absorption fluid for absorbing the desired amount of water vapors to pass therethrough. By a porous plate or partition is meant a plate or partition formed, not of material such as wire gauze, but of material without perceptible holes.

A construction of absorber according to the invention is diagrammatically illustrated by way of example in the accompanying drawing.

$a$ is a chamber or vessel containing sulfuric acid and $c$ a porous plate or partition through which the sulfuric acid can pass into an adjacent chamber or vessel $b$. The water vapors are led through the chamber or vessel $b$ through an inlet pipe $d$ and leave such chamber or vessel through an outlet pipe $e$.

The porous plate $c$ is of such a nature as only to allow the necessary amount of sulfuric acid for absorbing the desired amount of water vapors to pass into the chamber or vessel $b$, it being assumed as hereinbefore mentioned that this amount of sulfuric acid is constant during a certain time unit.

The porous wall $c$ may be made of any acidproof, porous material of sufficiently uniform structure, as for instance burnt clay, compressed carbon, etc., or a porous metal without perceptible holes.

The quantity of acid passing through the porous wall during a minute, for instance, can be determined by suitably fixing the degree of porosity of the wall. If with a given plate $c$, for instance, too much acid passes through same, then either a thicker plate or a less porous one must be substituted therefor.

While the absorption apparatus is in operation the amount of acid passing through the plate $c$ can be accurately controlled by regulating the difference in pressure in the two chambers $a$ and $b$.

The diluted sulfuric acid is collected at the bottom of the chamber or vessel $b$ and is from time to time withdrawn through a pipe $f$.

I claim:

1. An apparatus for absorbing water vapor from air or other gases comprising an absorbent chamber for containing a liquid absorbent, an adjacent vapor chamber adapted for the passage therethrough of air or gas containing water vapor to be extracted, and an imperforate acid proof porous partition between said chambers adapted to pass liquid absorbent into the vapor chamber.

2. An apparatus for absorbing water vapor from air or other gases comprising an absorbent chamber for containing a liquid absorbent, an adjacent vapor chamber adapted for the passage therethrough of air or gas containing water vapor to be extracted, and an imperforate acid proof porous partition between said chambers having a determinate capacity for the passage of a given quantity of the liquid absorbent into the vapor chamber.

In testimony that I claim the foregoing as my invention I have signed my name in presence of two subscribing witnesses.

PAUL SCHOU.

Witnesses:
ERNEST BOUTARD,
P. HOFMAN BARY.

Copies of this patent may be obtained for five cents each, by addressing the "Commissioner of Patents. Washington, D. C."